United States Patent [19]

Fennern

[11] Patent Number: 5,317,613
[45] Date of Patent: May 31, 1994

[54] FUEL DESIGN FOR HIGH POWER DENSITY BOILING WATER REACTOR

[75] Inventor: Larry E. Fennern, San Jose, Calif.

[73] Assignee: General Electric Company, San Jose, Calif.

[21] Appl. No.: 785,839

[22] Filed: Oct. 31, 1991

[51] Int. Cl.$^5$ .............................................. G21C 3/34
[52] U.S. Cl. .................................... 376/439; 376/444; 376/298
[58] Field of Search ............... 376/439, 298, 282, 292, 376/444; 976/DIG. 59, DIG. 189, DIG. 82

[56] References Cited

U.S. PATENT DOCUMENTS

| | | | |
|---|---|---|---|
| 3,393,128 | 7/1968 | Obertelli et al. | 376/439 |
| 3,746,617 | 7/1973 | Iwao et al. | 376/442 |
| 3,787,285 | 1/1974 | Marstrand | 376/439 |
| 3,809,610 | 5/1974 | Smith et al. | 376/439 |
| 4,056,440 | 11/1977 | MacBeth | 376/439 |

*Primary Examiner*—Donald P. Walsh
*Assistant Examiner*—Meena Chelliah
*Attorney, Agent, or Firm*—Robert R. Schroeder

[57] ABSTRACT

A reactor core with each fuel rod surrounded by an individual cylindrical channel is disclosed. This individual channel on each fuel rod provides thermal hydraulic and heat transfer advantages to enable all fuel rods within the fuel bundle to uniformly approach their own thermal limits. The preferred fuel rod pitch is a triangular pitch between the individual fuel rods as they are discretely surrounded by their own channel. The new triangular geometry provides for more uniform (flat) power distributions within all fuel rods—and hence all groups of fuel rods. Bypass flow is introduced uniformly between the fuel rod channels, rather than heterogeneously in the channel gap and water rods as in present BWR fuel designs. Individual fuel rod channels can be orificed differently, as required, to match inlet flow to fuel rod power output to maintain uniformity between all fuel rods as they approach their respective thermal limits. Gaps between bundles can be eliminated, or at least minimized, yielding even higher power density. Spacers with flow diverting structure vanes are applied within the fuel rod channel to limit relative displacement between the channel wall and fuel rod cladding and to serve as turbulent flow promoters.

16 Claims, 3 Drawing Sheets

FUEL DESIGN FOR HIGH POWER DENSITY BOILING WATER REACTOR

This invention relates to a boiling water nuclear reactor having high power density. More specifically, a fuel bundle construction is set forth in which each discrete fuel rod, consisting, for example, of a stack of fuel pellets enclosed in tubular cladding, has its very own concentric fuel channel. The fuel rods and concentric channels are preferably arrayed in a triangular matrix. A core of such fuel bundles has the characteristic that all rods uniformly approach their respective thermal limits enabling higher power density in the reactor.

BACKGROUND OF THE INVENTION

Problem Statement

Boiling water reactor power densities have been limited in the past to less than 56 kilowatts per liter (KW/l), primarily as a result of their original designs. These designs constrain the power outputs of these reactors due to thermal limits and stability considerations. Thermal limits include the maximum linear heat generation rate and the minimum critical power ratio.

The maximum linear heat generation rate (MLHGR) is that maximum amount of heat output by a lineal foot of fuel rod. Normal MLHGR rates for a boiling water nuclear reactor are in the range of 12.1 to 14.4 Kw/ft (or, 40 to 47 Kw/m using purely metric units). Simply stated, the MLHGR is a limitation established by the fuel pellet swelling establishing a mechanical interference with the cladding containing the fuel rod. The MLHGR cannot be exceeded at any individual fuel rod within a fuel bundle without potential damage to that particular fuel rod within the fuel bundle. As no individual rod is permitted to be damaged within a fuel bundle, the entire bundle is limited in its performance to maintain the maximum linear heat generation rate in any given fuel rod location. It is to be understood that to the extent a particular bundle constituting part of a reactor core is limited in its output, the entire core is likewise limited.

The minimum critical power ratio (MCPR) is the ratio of that level of fuel bundle power at which some point experiences transition from nucleate to film boiling compared to the then present output of the fuel bundle. This ratio is not permitted to be less than a numerical value of one anywhere within an individual fuel bundle. If the limit were to be exceeded at any given location within the fuel bundle, the temperature of the cladding of the fuel rod would rapidly increase due to increased resistance in the heat flow path from the interior of the fuel rod to the exterior of the fuel rod. Potential failure of the particular fuel rod cladding could follow.

The concept of a ratio is utilized in establishing limits of critical power within the fuel bundle. The ratio is maintained at a limit where operating conditions—both expected in normal operations and during anticipated abnormal operating occurrences or "transients"—can occur without running the risk of damage to the sealed fuel rods within the reactor.

In already designed nuclear reactors, these thermal limits are largely established by the original design. There is, however, a need to increase the power output density of nuclear reactors of new manufacture.

Accordingly, the factors relating to the power output densities will be briefly reviewed. Conventional fuel designs will be briefly discussed, especially insofar as they incorporate many heterogenous distributions in their neutron density and related power output. Thereafter, reference will be made to certain new reactor designs.

Regarding the factors relating to increasing power densities, vessel sizes are limited in diameter to approximately seven meters, given the desire to continue to use forging to manufacture such vessels in existing manufacturing facilities capabilities. There exists a reluctance to expand vessel fabrication facilities beyond existing size limits under present market realities. Therefore, each reactor vessel is practically limited in its diameter. This requires that the number of fuel bundles within a BWR core is therefore limited.

Limitations also exist in establishing the active fuel length of fuel rod bundles since as fuel rod length increases, thermal margins and stability become of concern. The longer the fuel bundle, the greater the possibility of transition boiling unless considerable additional inlet coolant flow is provided. This is aggravated, however, by the higher fuel bundle pressure drop associated with increased length and inlet flowrate. Further, stability at certain power rates requires rods be maintained short. If the boiling length is too long and the two-phase pressure drop too high, thermal-hydraulic, and thermal-hydraulic-nuclear instabilities arise. As a practical matter, the active fuel length is limited to about 12.5 feet (or 3.81 m using metric units).

Once it is understood that both vessel diameter and fuel rod length are limited as a practical matter, it becomes clear that the total reactor volume available in any given reactor vessel approaches a limit. Therefore, the practical volume limit for a reactor is about 100,000 liters.

When a reactor is built, many costs are fixed and constant regardless of the power output of the installed plant. If the installed plant can have a higher power density, these fixed and constant costs become substantially more efficient.

Thus, there is a need for a new fuel design approach with potential to achieve higher power density to reduce the capital costs of nuclear reactors. This will enable any given reactor to have higher power output.

The forced circulation boiling water reactor is one alternative reactor that is able to achieve the higher power density requirements. Simply stated, such reactors—by forcing the flow of coolant along internal paths—have the ability to concentrate more power in a given plant location.

A new concept boiling water reactor which boils all of the entering coolant to steam and then superheats the steam is another reactor which can benefit from the use of this fuel design. See my copending patent application entitled "STEAM COOLED NUCLEAR REACTOR WITH BI-LEVEL CORE", Ser. No. 07/681,246, filed Apr. 4, 1991, which is incorporated herein by reference.

CONVENTIONAL FUEL DESIGNS

Conventional fuel designs for boiling water reactors include discrete fuel bundles having groups of vertically upstanding fuel rods supported on a lower tie plate and maintained vertical by an upper tie plate. A channel surrounds the vertically upstanding fuel rods between the tie plates and isolates the fluid flow between the tie plates from the rest of the reactor. Among other things, this arrangement allows predictability of fuel bundle performance down to the fuel bundle level.

The chief concern with the design of modern fuel bundles has been nuclear efficiency improvement. Specifically, fuel bundles are designed to extract the maximum energy from the loaded nuclear fuel undergoing fission, typically by striving for uniform fuel rod power levels while minimizing the introduction of neutron absorbing materials in the core.

For a number of practical reasons, however, modern fuel bundles utilized in boiling water reactors are not uniform and include heterogenous power outputs on the individual fuel rods within the fuel bundles. For example, the fuel bundle channels are surrounded on the outside by the so-called core bypass volume exterior of the fuel bundle, a volume which is filled with water during operation. For shutdown purposes, the water is displaced by the insertion of control rod blades. Furthermore, nuclear instruments which measure neutron and gamma flux in the core for the purpose of measuring local and global power levels are also located in the water filled bypass region.

As a consequence, the fuel rods adjacent to the channel operate in a higher thermal neutron flux due to neutron moderation in the bypass water (which is greater than the moderation provided by the steam/water mixture interior to the bundle) and thus produce more power. To counter this, fuel enrichment is varied relative to these variant fast and slow neutron flux densities, and water rods replace select interior fuel rod locations for adding required fast neutron moderation with the end of maximum power extraction in mind.

For at least these reasons, although the fuel bundles are isolated into discrete—and hence predictable increments—the discrete fuel rods within modern fuel bundles are not homogenous relative to one another in their power output.

When the fuel rods within any given fuel bundle are not homogenous, this as a practical matters means that some portions of the fuel bundles reach their thermal limits before other portions of the fuel bundles. Those having skill in the art will understand that once a thermal limit is reached any where within a fuel bundle, the other portions of that same fuel bundle, and possibly other fuel bundles in the reactor core, are limited to that power output where the local thermal limit will not be exceeded.

STATEMENT OF THE PROBLEM TO BE SOLVED

Although modern fuel design has been concerned with nuclear efficiency, when contemplating the appropriate power density for a new nuclear power plant design, there is a tradeoff between nuclear efficiency as it may impact energy utilization and fuel cycle costs—which generally favors low power density—and the fixed plant capital costs incurred at the time of plant construction—which favor high power density to gain improvement in economy of scale. For a high power density plant, certain conventional design constraints in establishing fuel bundle design will be ignored. Since this is the case, the reader will understand that the invention is claimed insofar as departure from these conventional design constraints are concerned. Thus the realization that fuel cycle costs are secondary to plant capital outlay as a practical matter and the concession of nuclear efficiency as a traditional constraint are part of the invention set forth in the following specification.

SUMMARY OF THE INVENTION

This invention approaches the problem of achieving higher power density by proposing a fuel design which does not necessarily emphasize nuclear efficiency, although some design elements are not inconsistent with this conventional goal either. Instead the design emphasis is on uniformity of fuel rod power output throughout the core. There results a reactor core with discrete fuel bundle units where all rods many uniformly approach their respective thermal limits. With all rods approaching their respective thermal limits with uniformity, it is possible to impart a high power density to the reactor.

In the new design, the traditional BWR fuel channel surrounding a group of fuel rods is eliminated. In place of the traditional channel surrounding a group of fuel rods, each fuel rod is surrounded by its own individual cylindrical channel. This individual cylindrical channel on each fuel rod provides thermal hydraulic and heat transfer advantages to enable all fuel rods within the fuel bundle to uniformly approach their own thermal limits. At the same time, the individual fuel rod channels retain the concept of predictably segregating the fuel core into discrete fuel rod units to assure acceptable flow distributions without the need for complex 3-D analyses and multi-assembly thermal hydraulic confirmatory tests.

The preferred fuel rod pitch is a triangular pitch between the individual fuel rods as they are discretely surrounded by their own channel. The new triangular geometry provides for more uniform (flat) power distributions within all fuel rods—and hence all groups of fuel rods. Bypass flow is introduced uniformly between the fuel rod channels, rather than heterogeneously in the channel gap and water rods as in present BWR fuel designs. Individual fuel rod channels can be orificed differently, as required, to match inlet flow to fuel rod power output to maintain uniformity between all fuel rods as they approach their respective thermal limits. Gaps between bundles can be eliminated, or at least minimized, yielding even higher power density. Furthermore, for regions of the cores where steam cooling is significant, radiant transfer of heat between the outer surface of the fuel rod and the inner surface of the channel appreciably improves overall heat transfer to the steam coolant (on the order of 5 to 104 of the total heat transferred).

Spacers are judiciously applied within the fuel rod channel to limit relative displacement between the channel wall and fuel rod cladding and to serve as turbulent flow promoters.

DESCRIPTION OF THE PREFERRED EMBODIMENT

Figure 1:
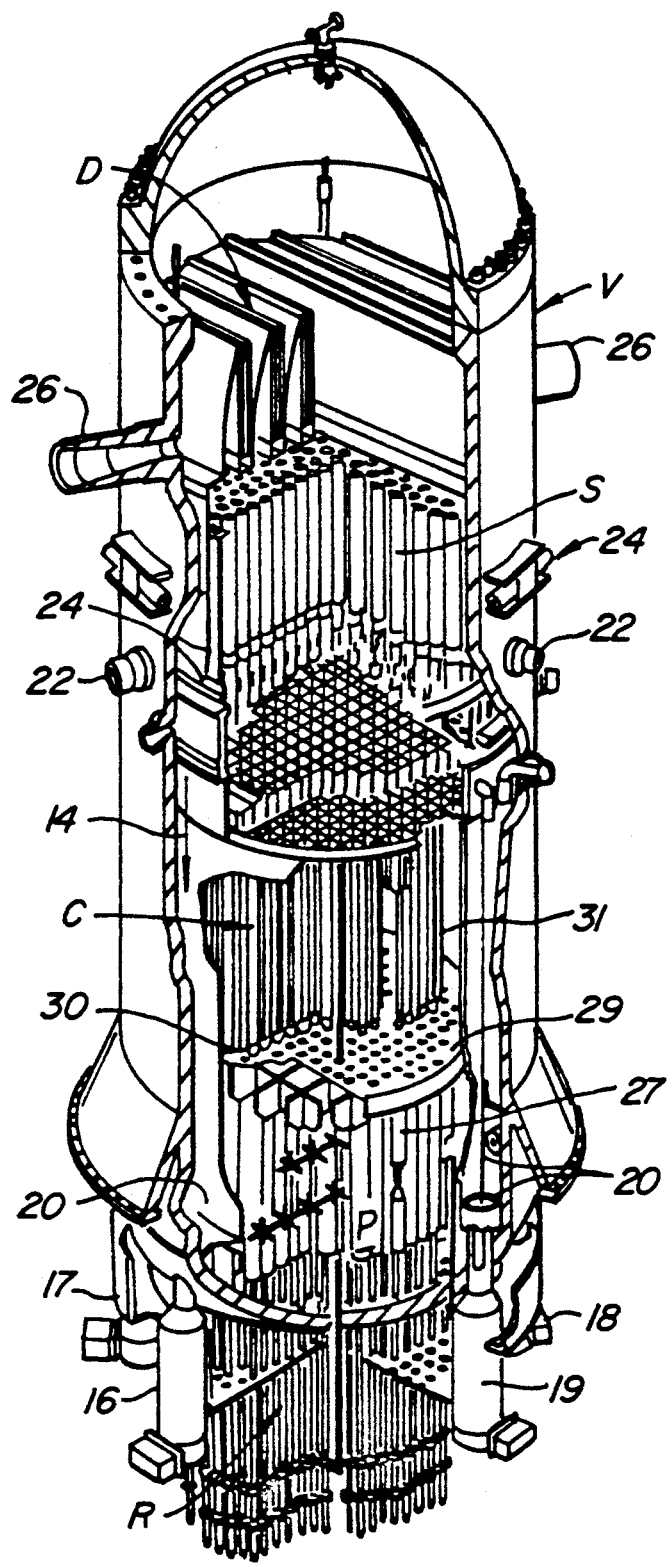
FIG. 1 is a perspective view of a forced circulation boiling water reactor in which internal shaft driven reactor pumps cause forced circulation for enabling higher power densities to be achieved within the limited volume of the reactor vessel.

Referring to FIG. 1, a reactor vessel V is shown in section for a forced circulation boiling water reactor. The reactor contains a core C with a plenum P therebelow. A plurality of control rods R extending through plenum P penetrate on a selected basis to control reactive output of the core C in its fission reaction. The vessel V includes a circuitous flow path which includes upward flow through core C into steam separators S and steam dryers D. Liquid rejected by the separators S passes downwardly between the core and the outside wall of the vessel in the direction of vector 14 and into the plenum P. At plenum P, the water again circulates up through the core.

This reactor is a forced circulation reactor including pumps 16-19, which each include propellers 20 for drawing the water downwardly along the sides of the core, and into plenum P. At plenum P, released water passes upwardly through the core, repeating in a cycle of endless circulation, the flow path here described.

Typically, feed water is introduced at an inlet 22 and disbursed through spargers 24. Likewise, steam for energy extraction is discharged from outlets 26 with extraction occurring at conventional turbines and condensers (not shown). Discharge from the condensers occurs to feed water makeup apparatus (also not shown) with return at apertures 22 of the reactor.

The bottom of the core includes a boundary known as core plate 29. Core plate 29 provides lateral support for fuel support pieces to form a hydraulic boundary at the bottom or entrance to core C. The fuel support pieces rest upon the control rod guide tubes 27. Fuel assemblies 31 are positioned in turn on the fuel support pieces. Specifically, the fuel assembly lower tie plate 30 rests upon the fuel support pieces embedded within the core plate 29.

Figure 2:
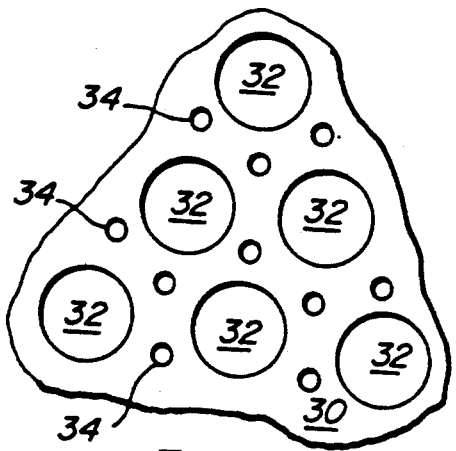
FIG. 2 is a plan view of a segment of the core plate at the lower portion of the core for admitting moderating coolant into the reactor, illustrating respective first apertures for admitting coolant to the fuel rods and channels and second apertures for admitting coolant to the core by-pass region.

The lower tie plate is further described by referring to FIG. 2, showing a cut away cross sectional view. Two types of apertures may be seen in the lower tie plate 30. A first set of apertures 32 communicates to the interior of each fuel channel, one of which, as described below, surrounds each individual fuel rod in the fuel assembly. Moderating coolant entering through the aperture 32 cools the fuel rods, and is eventually generated into steam for the extraction of energy.

Additionally, a second set of apertures 34 is illustrated. Apertures 34 flood the so-called core bypass region in between the fuel channels. This bypass region provides a surrounding moderator to each of the respective fuel rods.

Figure 3B:
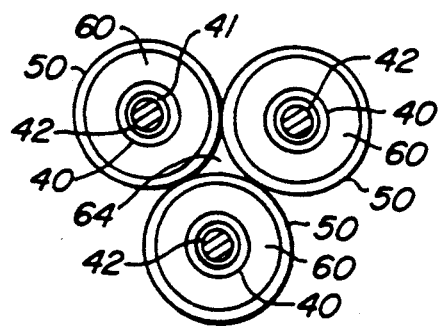
FIG. 3B is a section taken along lines 3B-3B of FIG. 3A.
Figure 3A:
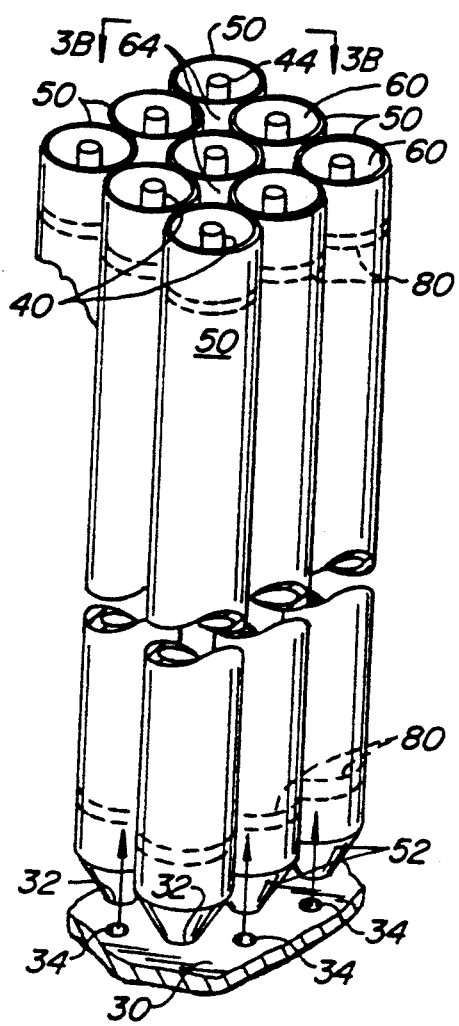
FIG. 3A is a perspective view of three fuel rods each with a discrete fuel channel communicated to the respective apertures in the underlying core plate.

Referring to FIGS. 3A and 3B, the configuration of the core can be better understood. Referring first to FIG. 3B, each fuel rod includes fuel cladding 40, surrounding a column of fuel pellets 42. A gap 41 typically exists between the pellets and the clad for the purpose of collecting and distributing released fission product gases. As is common in the art, the columns are sealed at their respective ends 44 and constitute discrete pressure vessels containing fuel pellets and collected fission product gases interior of the reactor.

As a novel feature of this invention, each column is surrounded by its own discrete channel 50. Channels 50 are communicated at their lower end 52 to each of the apertures 32 in the lower tie plate 30.

It will be understood that there will be two flow volumes interior of the core. The first flow volume 60 is defined in the upright concentric annulus about the fuel rods 40. It is in this region that the coolant is heated by the fuel rod.

Secondly, there is a bypass region 64 between the respective channels. It is into this region that liquid moderator from the lower tie plate extends the entire distance between the respective lower tie plate and the top of the core with proper sizing of holes 34, as illustrated at the top portion of FIG. 3A.

Figure 4:
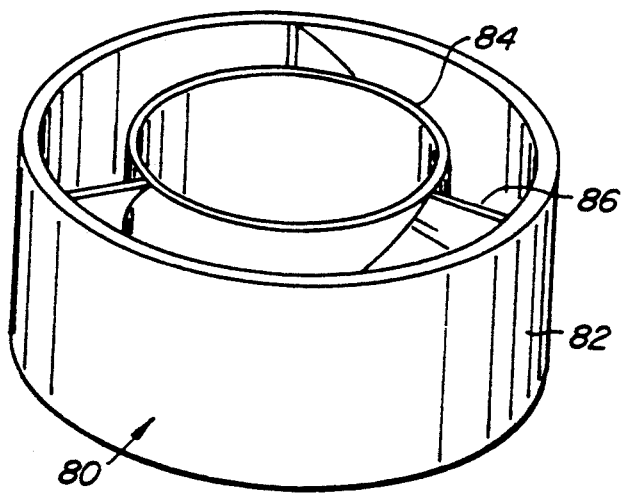
FIG. 4 is a detail of a spacer located between the fuel rods and the individual channels, the spacer here illustrated taking the form of vanes for swirling the coolant as it passes concentrically upwardly about the fuel rod between the channel and fuel rod.

The fuel rod 40 is displaced from the fuel channel 50 by a spacer 80. Although various spacer designs are possible, a novel and exemplary design is illustrated in FIG. 4. Rings 80 and 84 form tight ferrule bushings between the channel wall 50 and fuel rod 40, respectively. Angular disposed vanes 86 maintain a fixed distance between the fuel channel 50 and fuel rod 40. Spacers are periodically provided along the axial extent of the fuel channels as shown in FIG. 3A.

The new design contains additional structural material in the channels 50 over present conventional BWR fuel designs. This additional material has the advantage of adding considerable rigidity to the contained fuel rod 40. Unfortunately, this channel design absorbs neutrons. Since each fuel rod has its own channel, more neutrons will be lost in channel absorption than in conventional fuel designs.

This absorption of neutrons at the channel walls can be partially mitigated. It is to be noted that by optimizing fuel rod cladding and fuel rod channel dimensions, half of the channel material can be compensated for by elimination of the relatively thick fuel bundle channel of current designs. Accordingly, representative dimensions compared to a conventional fuel design which can be utilized are contained in the following table:

|  | This Invention | Conventional |
| --- | --- | --- |
| Number of fuel rods | 91 | 64 |
| Fuel rod geometry | Triangular Pitch | Square Pitch |
| Cladding Outer Diameter | 8.0 mm | 12.3 mm |
| Cladding Thickness | 0.64 mm | 0.76 mm |
| Number of Channels | 91 | 1 |
| Channel Geometry | Cylindrical Tube | Square Box |
| Channel Inside Span | 15 mm | 134 mm |
| Channel Thickness | 0.64 mm | 2.0 mm |

It will be seen that the resulting core and fuel rod configuration includes a more homogenous cross section. Consequently, all of the contained fuel rods 42 will approach their respective thermal limits with uniformity. As a consequence, the power density of the reactor can be increased.

A summary of the advantages realized by this design includes advantage realized in maximum linear heat generation rate, minimum critical power ratio, and stability of the reactor at certain less-than-rated coolant flow rates.

Maximum Linear Heat Generation Rate

More uniformly distributed core bypass flow volume 64 (of the liquid water phase in a BWR application) provides for flatter axial power distributions and lower power mismatch between fuel rods at any given axial level ("local peaking" reduction) due to the relatively more homogeneous mixture of materials throughout the extent of the core. This in turn results in smaller deviations of the maximum linear heat generation rate (MLHGR) from average value during operations, permitting higher power densities while still satisfying the MLHGR criterion.

Use of the triangular pitch also yields a higher packing density of fuel rods within the core relative to that attained with a square pitch. Relative to the current square pitch, this means lower power per fuel rod for a given common power level, providing additional MLHGR relief and opportunity for increasing the power density.

Minimum Critical Power Ratio

Reductions in rod-to-rod power mismatch also has a beneficial effect for the minimum critical power ratio (MCPR). All rods uniformly approach this critical power ratio limitation. Further benefits are provided by the capability to selectively orifice each discrete fuel rod at its discrete channel to match flow rates to power production rates and to promote flow turbulence near the fuel rod clad boundary. As a result, the bundle critical power increases and margin is provided to increase power density.

Selective orificing can be provided by adjusting the angular deflection of the fixed vanes 86 shown in FIG. 4. This changes the coolant flow resistance or pressure drop characteristics of the individual fuel channel, forcing a particular distribution of inlet flow.

Figure 6:
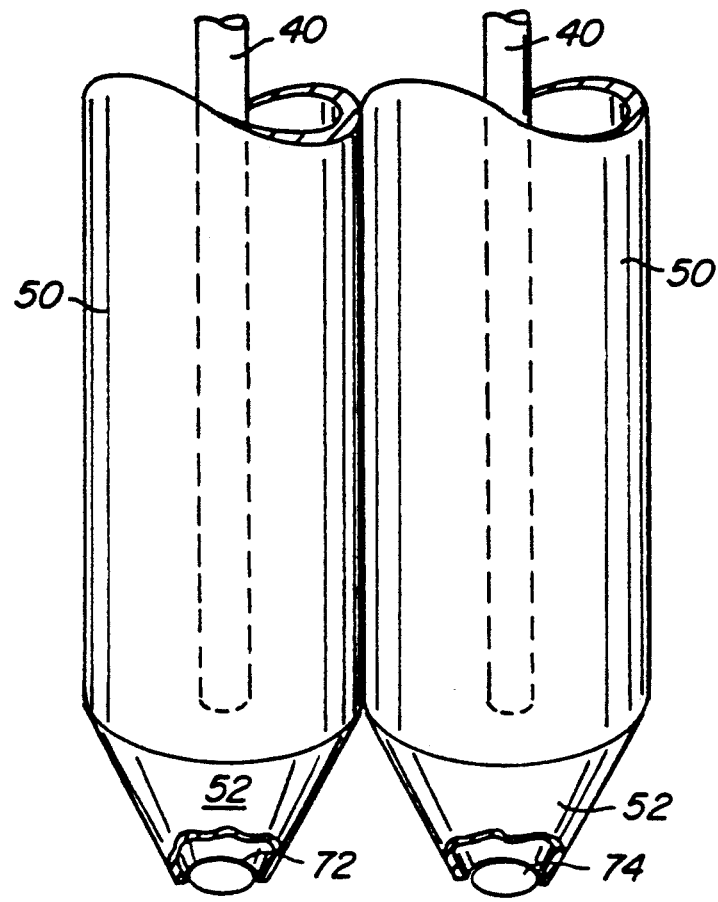

Another means to selectively orifice is show in FIG. 6. Referring to FIG. 6, the bottom section 52 of two channels 50 are illustrated. It can be seen that the bottom sections 52 can be provided with different size apertures 72, 74. These differing size apertures throttle the inflow of the moderator coolant and permit varying flow rates to occur through the bundles of this invention.

Stability

Stability is not necessarily a limitation for increasing power density for the forced circulation plant illustrated in FIG. 1. In such forced circulation reactors, power-flow map exclusion regions can be defined and appropriate controls and instrumentation installed to avoid operations, even for upset conditions, in an operating region which may potentially result in fuel channel flow instability. Some designs, for example, selectively insert control rods automatically when flow is reduced below a certain setpoint to limit the core power level and avoid unstable power-flow regions.

Nonetheless, this invention provides capability to improve stability from the viewpoint of root cause, which is insufficient coolant flow and high pressure drop in the upper two phase region of the fuel bundles. It can be seen that through selective orificing, higher flows can be promoted in fuel rod channels which would otherwise have lower margins for stable operation.

Spacer Construction

Referring to FIG. 4, the construction of a spacer utilized with this invention can be understood. Spacer 80 consists of two concentric ferrules 82, 84 separated by vanes 86 through which coolant flow passes. The inner ferrule 82 fits over the fuel rod clad 40, while the outer ferrule 82 fits against the fuel rod channel 50 at the inner wall.

Spacers 80 are positioned at the entrance, exit and intermediate positions of the fuel rod channel as necessary to satisfy mechanical requirements to limit fuel rod and channel displacements. Spacers can also be positioned as appropriate to promote turbulent flow and improved heat transfer characteristics.

Vanes 86 are pitched in a propeller-like array. The pitch of vanes 86 may impart a spiral curvature to upwardly flowing fluid. This spiral curvature imparted to the fluid can promote additional flow turbulence. Additionally, the pitch of the spacer vanes 86 can provide an orificing effect for matching inlet flow to the discrete fuel rod power production. As can be seen, vane 86 in FIG. 4 has imparted to fluid flowing by vane 86 a spiral path.

Figure 5:
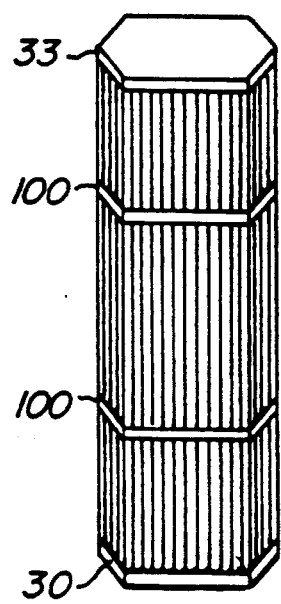
FIG. 5 is a perspective view of a hexagonal fuel bundle incorporating the individual fuel rods and fuel channels into a group bounded between discrete group tie plates to enable convenient handling of the fuel within the reactor; and, FIG. 6 is a perspective view of the inlet to a fuel rod and its discrete channel so that individual throttling of the fluid flow through the fuel rod and discrete channel can occur to tailor hot operation to uniformly approach the desired thermal limits.

Referring to FIG. 5, it can be seen that individual fuel channels 50 each with contained fuel rods 40 and spacers 80 are bundled together using external bundle wrappers 100 (straps). The bottom and top of the fuel bundle are secured with lower tie plate 30 and upper tie plate 31, respectively. Selected channels extend through the tie plates and are provided with end threads for the purpose of bolting the bundle to form a secured assembly. As seen in FIG. 5, ninety one fuel rods 40 are each fastened in an hexagonal configuration with their respective surrounding channels 50. It is contemplated that this group of ninety one fuel rods 40 and fuel channels 50 would be handle as a unitary group, much in the same manner that many fuel rods contained within more conventional fuel bundles are now handled.

What is claimed is:

1. In a core for a nuclear reactor wherein said reactor includes:
   a reactor pressure vessel;
   a core central of said pressure vessel for containing fuel in sealed tubes for undergoing fission reaction;
   moderator coolant for circulation through said pressure vessel for extracting the heat of fission from said sealed tubes;
   a defined flow path for circulation of said moderator coolant through said vessel including a first upwardly passing leg in said flow path from the bottom of sad core to the top of said core in contact with said sealed tubes for undergoing fission reaction for the extraction of heat to said moderator coolant and a second upwardly passing leg in said flow path from the bottom of said core to the top of said core away from said sealed tubes for undergoing fission;
   a power discharge path interior of said pressure vessel for the discharge of energy imparted at said core to said moderator coolant; and a moderator-coolant inflow for resupplying said reactor with moderator coolant for producing in said vessel a continuous power generation cycle;

the improvement to said core comprising:

a plurality of vertically upstanding fuel rods;

a corresponding plurality of vertically upstanding channels, each said channel surrounding discretely a fuel rod to define interiorly of each said channel said first upwardly passing leg in said flow path from the bottom of said core to the top of said core in contact with said sealed tubes for undergoing fission reaction for the extraction of heat to said moderator coolant and to define exterior of each said channel said second upwardly passing leg in said flow path from the bottom of said core to the top of said core away from said sealed tubes for undergoing fission;

means for connecting each said channel to receive moderator coolant at the bottom of each said core;

means for connecting each said channel to discharge said moderator coolant at the top of said core; and, means for connecting the regions exterior of said channels to said moderator coolant inflow whereby said second upwardly passing leg in said flow path from the bottom of said core to the top of said core away from said sealed tubes for undergoing fission bypasses the interior of said channels.

2. The invention of claim 1 and wherein said fuel rods and fuel channels are arrayed in a triangular pitch.

3. The invention of claim 1 and wherein said moderator coolant entering said core is liquid water.

4. The invention of claim 1 and wherein said moderator coolant entering said core is steam.

5. The invention of claim 1 and wherein said fuel rods have said fuel channels concentrically about said fuel rods.

6. The invention of claim 1 and including spacers between said fuel rods and said fuel channels, said spacers including radially extending vanes, said vanes centering said fuel rods concentrically interior of said channels at the radially inward end, extending to said channel at the radially outward end, and providing a flow control surface between said inner and outer end for controlling the flow of moderator coolant between said channel and fuel rod.

7. The invention of claim 1 and wherein each said fuel channel is individually throttled about each said fuel rod.

8. A fuel element design for a boiling water nuclear reactor having a central core for containing nuclear fuel in sealed tubes for undergoing fission reaction in the presence of circulating moderator-coolant, said fuel element comprising in combination:

a moderator-coolant flow path for supplying said reactor with a moderator-coolant flow for producing in said reactor a continuous moderator-coolant flow path for the extraction of heat from said reactor;

side by side fuel elements disposed in said reactor flow path, each element including, a central vertically disposed fuel rod, said fuel rod sealed at both ends and containing interior thereof fuel for undergoing fission reaction interior of said fuel element;

a concentric channel individually surrounding each said fuel rod, said fuel channel open at the bottom of said core for receiving moderator coolant from the bottom of said channel and for discharging moderating coolant at the top of said channel and defining a coolant annulus therebetween;

spacer means in said moderator coolant annulus extending from said channel to said fuel rod for maintaining said fuel rod in spaced apart relation relative to said channel; and, flow control means on said spacer means for imparting to moderator coolant passing upwardly between said channel and fuel rod in said modertor coolant annulus controlled fluid flow.

9. The invention of claim 8 and wherein said flow control means controls pressure drop.

10. The invention of claim 8 and wherein said flow control means promotes flow turbulence to enhance heat transfer.

11. A fuel rod cladding to fuel channel fuel element design for a boiling water nuclear reactor having:

a reactor pressure vessel;

a core central of said pressure vessel for containing fuel in sealed tubes for undergoing fission reaction;

moderator coolant for circulation through said pressure vessel for extracting the heat of fission from said sealed tubes;

a defined flow path for circulation of said moderator coolant through said vessel including a first upwardly passing leg in said flow path from the bottom of said core to the top of said core in contact with said sealed tubes for undergoing fission reaction for the extraction of heat to said moderator coolant and a second upwardly passing leg in said flow path from the bottom of aid core to the top of said core away from said sealed tubes for undergoing fission;

a power discharge path interior of said pressure vessel for the discharge of heat energy imparted at said core to said moderator coolant; and, a moderator-coolant inflow for resupplying said reactor with moderator coolant for producing in said vessel a continuous power generation cycle;

the improvement to said core comprising in combination:

a plurality of vertically upstanding fuel rods;

a corresponding plurality of vertically upstanding channels, each said channel surrounding discretely a fuel rod to define a moderator path within said channel and around said fuel rod isolated from a core bypass volume exterior of said channel;

a core plate at the bottom of said core, said core plate and embedded fuel support pieces providing a boundary between said plenum and said core;

a fuel tie plate at the bottom of a collection of said fuel rods resting on fuel support pieces embedded within said core plate;

means for connecting each said channel to receive moderator coolant at the bottom of said core defined in said core plate and said lower tie plate for passing moderator between said fuel rods and said channel to establish said first upwardly passing leg in said flow path from the bottom of said core to the top of said core in contact with said sealed tubes for undergoing fission reaction for the extraction of heat to said moderator coolant each said collection of fuel rods and said plenum;

means for distributing coolant by apertures in said fuel tie plate to said fuel channels; and means for connecting the core bypass volume exterior of each said channel to said plenum defined by said core plate and said fuel tie plate to establish said second upwardly passing leg in said flow path from the bottom of said core to the top of said core away from said sealed tubes for undergoing fission whereby said discrete channels exterior of said fuel rods are surrounded by moderator coolant.

12. The invention of claim 11 and wherein said moderating coolant is water.

13. The invention of claim 11 and wherein said moderating coolant is steam.

14. The invention of claim 11 and wherein one of said channels through said core plate has an aperture different than another of said channels at said lower tie plate for producing varying fluid flow to said channels through said lower tie plate.

15. In a core for a boiling water nuclear reactor wherein said reactor includes:
a reactor pressure vessel;
a core central of said pressure vessel for containing fissionable fuel in sealed tubes for undergoing fission reaction;
moderator coolant for circulation through said pressure vessel for extracting the heat of fission from said sealed tubes;
a defined flow path for circulation of said moderator coolant through said vessel including a first upwardly passing leg in sad flow path from the bottom of said core to the top of said core in contact with said sealed tubes for undergoing fission reaction for the extraction of heat to said moderator coolant and a second upwardly passing leg in said flow path from the bottom of said core to the top of said core away from said sealed tubes for undergoing fission;
a power discharge path interior of said pressure vessel for the discharge of energy imparted at said core to said moderator coolant; and,
a moderator-coolant inflow for resupplying said reactor with moderator coolant for producing in said vessel a continuous power generation cycle;
the improvement to said core comprising:
a plurality of vertically upstanding fuel rods;
a corresponding plurality of vertically upstanding channels, each said channel surrounding discretely a fuel rod;
spacer means for connecting said fuel rods and channels into a rigid unitary structure;
means for binding groups of said fuel channels with said spacers therein for defining unitary fuel assemblies containing a plurality of fuel rods and a corresponding plurality of channels;
means for connecting each said channel to receive moderator coolant at the bottom of said core;
means for connecting each said channel to discharge said moderator coolant at the top of said core whereby said first upwardly passing leg in said flow path from the bottom of said core to the top of said core in contact with said sealed tubes for undergoing fission reaction for the extraction of heat to said moderator coolant; and,
means for connecting the interstital volume defined by said channels outside of said channels to said moderator coolant flow path whereby a second upwardly passing leg in said flow path from the bottom of said core to the top of said core away from said sealed tubes for undergoing fission.

16. The invention of claim 15 and including:
a core plate at the bottom of said core, said core plate with embedded fuel support pieces for defining a boundary between said core and said flow path across which said moderator coolant has to enter said core; and wherein:
a fuel tie plate at the bottom of a collection of said fuel rods resting on fuel support pieces embedded in said core plate;
said means for connecting each said channel to receive moderator coolant to enter the bottom of said core through said fuel tie plate includes first apertures defined in said fuel tie plate; and,
said means for connecting the interstitial volume defined by said channels outside of said channels, said moderator coolant to enter said interstitial volume between said channels of said core includes second apertures defined in said fuel tie plate.

* * * * *